United States Patent
Ro et al.

(10) Patent No.: US 7,512,960 B2
(45) Date of Patent: Mar. 31, 2009

(54) HUB-MOUNTED OPTICAL DISK HAVING A REDUCED HEIGHT

(75) Inventors: Myong-do Ro, Gyeonggi-do (KR); Han-kook Choi, Gyeonggi-do (KR); Dong-seob Jang, Seoul (KR); Du-seop Yoon, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 573 days.

(21) Appl. No.: 10/923,016

(22) Filed: Aug. 23, 2004

(65) Prior Publication Data
US 2005/0086680 A1    Apr. 21, 2005

(30) Foreign Application Priority Data
Oct. 18, 2003    (KR) .................... 10-2003-0072797

(51) Int. Cl.
    *G11B 7/24*   (2006.01)
    *G11B 23/03*  (2006.01)
(52) U.S. Cl. ........................ 720/721; 360/133
(58) Field of Classification Search ......... 720/721–724; 360/133
    See application file for complete search history.

(56) References Cited

U.S. PATENT DOCUMENTS

| | | | |
|---|---|---|---|
| 4,570,194 A | 2/1986 | Schatteman | 360/99.12 |
| 4,945,530 A | 7/1990 | Sandell et al. | 720/738 |
| 5,504,735 A * | 4/1996 | Ota et al. | 369/282 |
| 5,864,534 A * | 1/1999 | Fairchild et al. | 720/721 |
| 6,011,771 A | 1/2000 | Akama et al. | 720/711 |
| 6,154,441 A * | 11/2000 | Sandstrom et al. | 369/282 |
| 6,285,651 B1 | 9/2001 | Boutaghou et al. | 720/721 |
| 2002/0054566 A1 * | 5/2002 | Netsu et al. | 369/291 |

FOREIGN PATENT DOCUMENTS

| | | | |
|---|---|---|---|
| JP | 07110996 A | * | 4/1995 |
| JP | 08077610 A | * | 3/1996 |

* cited by examiner

*Primary Examiner*—David D Davis
(74) *Attorney, Agent, or Firm*—Stein, McEwen & Bui, LLP

(57) ABSTRACT

A hub-mounted optical disk to eliminate the need for a separate stack ring while decreasing the overall height, a method of fabricating the optical disk, and an injection molding die for manufacturing an optical disk substrate. The hub-mounted optical disk includes a substrate having a hollow and an indented portion engraved to a predetermined depth on the inside of a non-recording surface where no information is recorded; and a hub including a plate that has a fitting hole therein and is engaged into the hollow and the indented portion and a central ring that is inserted into the fitting hole. The method of fabricating the hub-mounted optical disk includes mounting the hub onto a magnetic chuck, applying an ultraviolet (UV) hardening resin on the indented portion of the substrate, operating the magnetic chuck so that the plate is in contact with the indented portion, and curing the UV hardening resin by irradiating it with UV light. The injection molding die for manufacturing the optical disk substrate includes a stationary plate having an injection nozzle that allows resin forming the substrate to be injected, a stamper that has a predetermined information recording pattern, and a moving plate having a projecting portion at the center.

14 Claims, 4 Drawing Sheets

HUB-MOUNTED OPTICAL DISK HAVING A REDUCED HEIGHT

CROSS-REFERENCE TO RELATED APPLICATION

This application claims the priority of Korean Patent Application No. 2003-72797, filed on Oct. 18, 2003, in the Korean Intellectual Property Office, the disclosure of which is incorporated herein in its entirety by reference.

BACKGROUND OF THE INVENTION

1. Field of the Invention

The present invention relates to a hub-mounted optical disk that is magnetically mounted on a turntable, a method to fabricate the optical disk, and an injection molding die to manufacture an optical disk substrate, and more particularly, to a hub-mounted optical disk designed to eliminate the need for a separate stack ring while reducing the overall height, a method to fabricate the optical disk, and an injection molding die to manufacture an optical disk substrate.

2. Description of the Related Art

Typically, a slim optical recording/reproducing apparatus employs a technique in which an optical disk is mounted on a turntable fixed to a rotating axis of a spindle motor by a magnetic attraction force that is produced by a magnet. To this end, the apparatus adopts an optical disk to which a hub made of magnetic material is affixed.

Referring to FIG. 1, a conventional hub-mounted optical disk includes a substrate 1 having a hollow 1a and a hub 10 inserted into the hollow 1a. The hub 10 is comprised of an engaging portion 11 which is inserted into the hollow 1a and a flange 13 that covers a portion of an inside surface of the substrate 1. The hub 10 having a seating hole 10a is made from magnetic material.

A slim optical recording and/or reproducing apparatus includes a spindle motor 20 having a rotating axis 25, a turntable 21 fixed to the rotating axis 25, and a magnet 23 mounted on the turntable 21. The rotating axis 25 projects through a space at the center of the turntable 21. Thus, when the optical disk is installed such that the rotating axis 25 fits into the seating hole 10a, the optical disk is mounted on the turntable 21 by magnetic attraction between the flange 13 and the magnet 23.

Here, the flange 13 projects toward one side of the substrate 1, which makes reducing the overall thickness of the optical disk and realizing a compact optical disk drive difficult.

SUMMARY OF THE INVENTION

Therefore, the present invention provides a hub-mounted optical disk constructed to eliminate the need for a separate stack ring used to stack an optical disk substrate while decreasing the overall height.

The present invention also provides a method of manufacturing the optical disk designed to have a hub correctly attached to an optical disk substrate.

The present invention also provides an injection molding die to manufacture the optical disk substrate to which the hub is mounted.

According to an aspect of the present invention, a hub-mounted optical disk includes a substrate having a hollow and an indented portion engraved to a predetermined depth on the inside of a non-recording surface where no information is recorded; and a hub, the hub including a plate that has a fitting hole therein and is engaged into the hollow and the indented portion and a central ring that is inserted into the fitting hole and guides a location where the optical disk is attached with respect to a center of the turntable.

Alternatively, the hub-mounted optical disk may includes a substrate having a hollow and an indented portion engraved to a predetermined depth on the inside of a non-recording surface where no information is recorded; and a hub, the hub including a seating portion that has a fitting hole therein and is located within the hollow and a flange portion that is attached to the indented portion and disposed along the outer perimeter of the seating portion at a different height from the seating portion.

According to another aspect of the present invention, there is provided a method of fabricating a hub-mounted optical disk including a substrate having a hollow and an indented portion engraved to a predetermined depth on the inside of a non-recording surface where no information is recorded, and a hub that has a fitting hole therein and is engaged into the hollow and the indented portion. The method includes preparing a magnetic chuck that may be moved up and down and has a central pole projecting out at the center; mounting the hub on the magnetic chuck and separating the hub from the substrate by a predetermined spacing; applying a UV hardening resin on the indented portion of the substrate; operating the magnetic chuck so that the plate is in contact with the indented portion; and curing the UV hardening resin by irradiating it with UV light.

According to another aspect of the present invention, there is provided an injection molding die to manufacture an optical disk substrate. The injection molding die includes: a stationary plate having an injection nozzle that allows resin forming the substrate to be injected; a stamper that has a predetermined information recording pattern and is disposed inside the stationary plate; and a moving plate that is movably disposed opposite the stationary plate with the stamper being formed therebetween and has a projecting portion at the center. A resin is injected into a cavity between the stamper and the moving plate via the injection nozzle in order to manufacture the substrate having an indented portion engraved to a predetermined depth on the inside of a non-recording surface where no information is recorded.

Additional and/or other aspects and advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Figure 1:
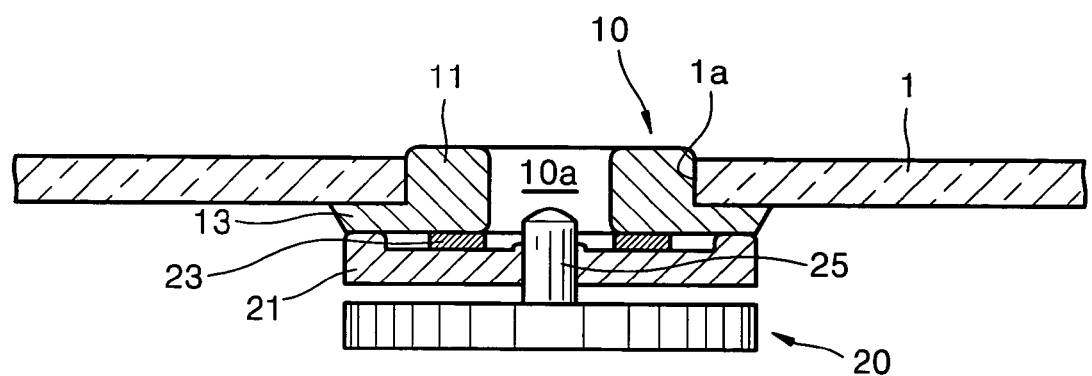
FIG. 1 is a cross-sectional view of a conventional hub-mounted optical disk.

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 2:
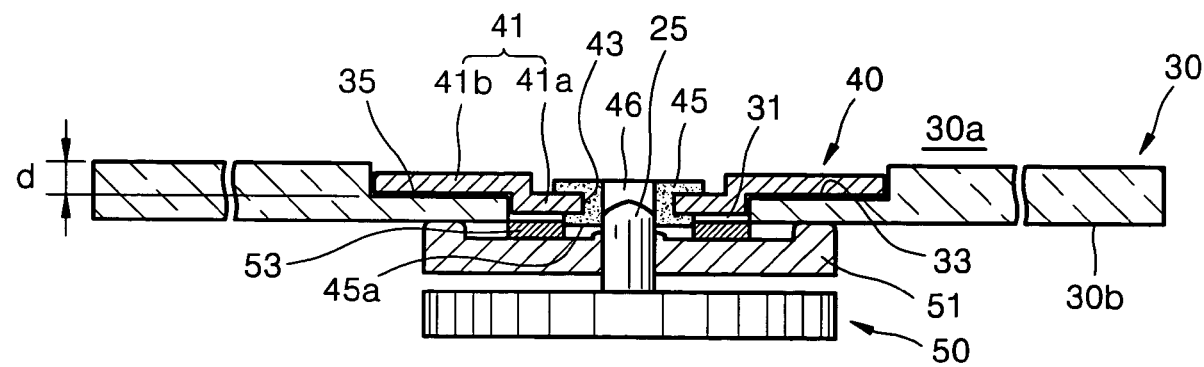
FIG. 2 is a cross-sectional view of a hub-mounted optical disk according to an embodiment of the present invention.
Figure 3:
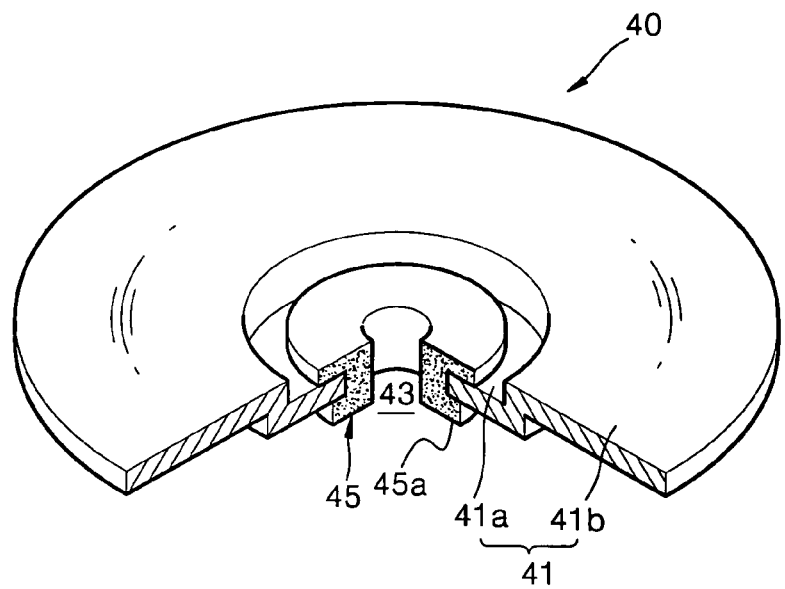
FIG. 3 is a partially broken-away perspective view of the hub shown in FIG. 2.

Referring to FIGS. 2 and 3, a hub-mounted optical disk according to an embodiment of the present invention includes a substrate 30 having a hollow 31 and a hub 40 mounted into the hollow 31 of the substrate 30. The substrate 30 has an indented portion 33 engraved to a predetermined depth on the inside of a non-recording surface 30a where no information is recorded. In an embodiment of the invention, a depth d of the indented portion 33 falls within a Range (1):

$$0.1 \leq d \leq 0.6 \text{ mm} \tag{1}$$

Here, the range of the depth d is set such that the overall height of the optical disk combined with the hub 40 is not significantly greater than the thickness of the substrate 30. As an example, when the depth d of the indented portion 33 is set to 0.3 to 0.4 in an optical disk having a 0.6 mm thick substrate 30, significantly reducing the overall height of the optical disk combined with the hub 40 compared to that of the conventional disk described earlier with reference to FIG. 1 is possible.

The hub 40 includes a plate 41 having a fitting hole 43 therein and a central ring 45 inserted into the fitting hole 43. The plate 41 engages with both the hollow 31 and the indented portion 33 and includes a seating portion 41a and a flange portion 41b. The seating portion 41a to which the central ring 45 is mounted is located within the hollow 31 and is seated on a turntable 51 that rotates on a spindle motor 50. The flange portion 41b is attached to the indented portion 33 and is disposed along the outer perimeter of the seating portion 41a at a greater height than the seating portion 41a. Due to the difference in height between the flange portion 41b and the seating portion 41a, reducing the overall height of the optical disk when the hub 40 is combined with the substrate 30 is possible.

The central ring 45 is fitted into the fitting hole 43 and guides the optical disk to a location where the optical disk may be attached to a center of the turntable 51. In an embodiment of the invention, the central ring 45 is formed in the plate 41 by insertion-injection molding. Since insertion-injection is a widely-known technique, a detailed explanation thereof will not be given.

Here, the plate 41 is made from magnetic material and is clamped to the optical disk by a magnetic attraction between the plate 41 and a magnet 53 that is mounted on the turntable 51. The magnetic material may be stainless metal such as SUS 430. The central ring 45 is made from a plastic material such as poly-carbonate (PC) to allow forming via insertion-injection.

An ultra-violet (UV) hardening resin is used to affix the hub 40 to the substrate 30. Specifically, the UV hardening resin 35 is applied between the indented portion 33 and the plate 41 and irradiated by UV light to cure the UV hardening resin 35 to bond the plate 41 to the substrate. The process will be described in detail later.

The central ring 45 acts as a stack ring since an end 45a of the central ring 45 projects toward an information recording surface 30b of the substrate 30. By designing the central ring 45 in this way, preventing damage to the information recording surface 30b during storage and transportation of a stack of optical disks is possible. Here, in an embodiment of the invention, the end 45a of the central ring 45 projects to a height of about 0.1 to 0.15 mm. This makes reducing the overall height of the optical disk as well protecting the information recording surface 30b from damage and contamination possible.

The construction of the hub 40, in that the hub 40 comprises the plate 41 and the central ring 45, as described above, makes increasing a tolerance in manufacturing the plate 41 using a press possible. That is, the inner radius of the central ring 45 may be controlled such that the central ring 45 is accurately centered with respect to a central axis 55 of the spindle motor 50. Thus, manufacturing the hub 40 is made relatively easier than in conventional hub-mounted optical disks.

Figure 4:
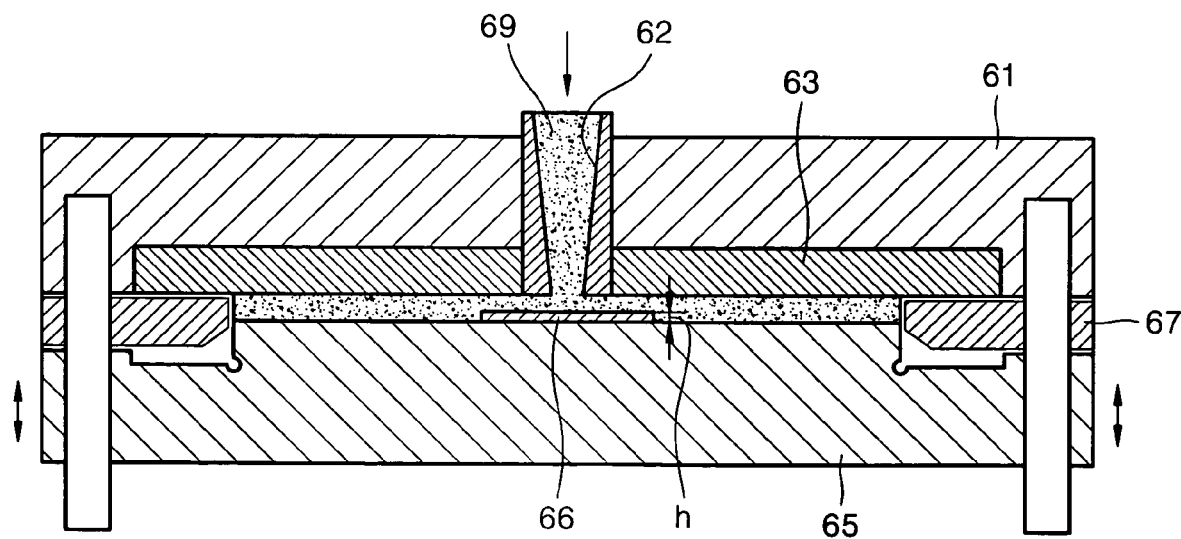
FIG. 4 is a cross-sectional view of an injection molding die for manufacturing an optical disk substrate according to an embodiment of the present invention.

Referring to FIG. 4, an injection molding die to manufacture an optical disk according to an embodiment of the present invention is used to fabricate the optical disk substrate 30 shown in FIG. 2. The injective molding die includes a stationary plate 61, a stamper 63, having a predetermined information recording pattern, and a moving plate 65.

The stationary plate 61 has an injection nozzle 62 that allows a resin 69 forming the substrate (30 of FIG. 2) to be injected. The stamper 63 is disposed inside the stationary plate 61. The moving plate 65 is movably disposed opposite the stationary plate 61 with the stamper 63 being formed therebetween. The moving plate 65 has a projecting portion 66 formed at a location corresponding to the indented portion (33 of FIG. 2) to be formed later.

To create a space corresponding to the substrate 30 to be formed, a cavity ring 67 surrounding the space is disposed between the stationary plate 61 and the moving plate 65. Thus, a cavity, having a predetermined thickness, is formed between the stamper 63 and the moving plate 65, into which the resin 69 is injected via the injection nozzle 62. The injected resin 69 is then hardened to form the indented portion (33 of FIG. 2) on the non-recording surface (30a of FIG. 2). Then, the center of the indented portion 33 is perforated with a predetermined diameter to form the hollow (31 of FIG. 2), thereby completing the substrate 30. In an embodiment of the invention, a height h of the projecting portion 66 falls within a Range (2):

$$0.1 \leq h \leq 0.6 \text{ mm} \tag{2}$$

Figure 5A:
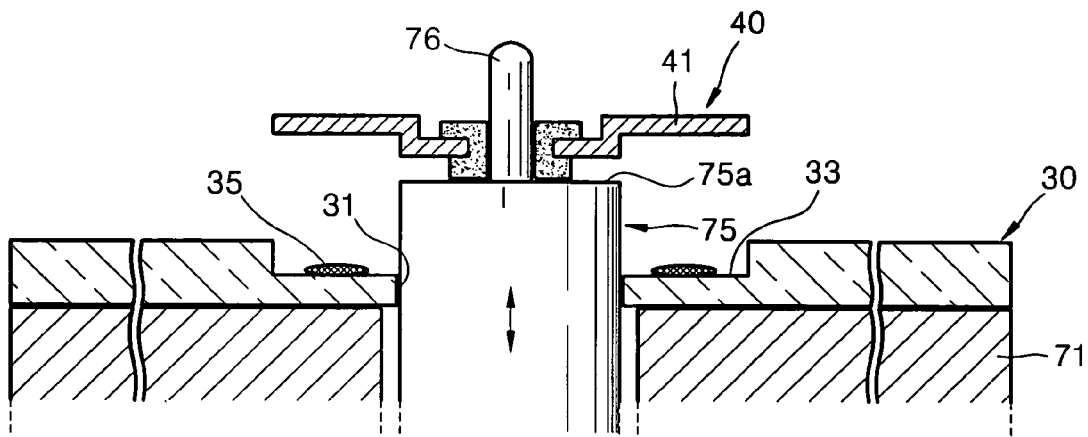
FIGS. 5A-5C illustrate a process of manufacturing a hub-mounted optical disk according to an embodiment of the present invention.
Figure 5B:
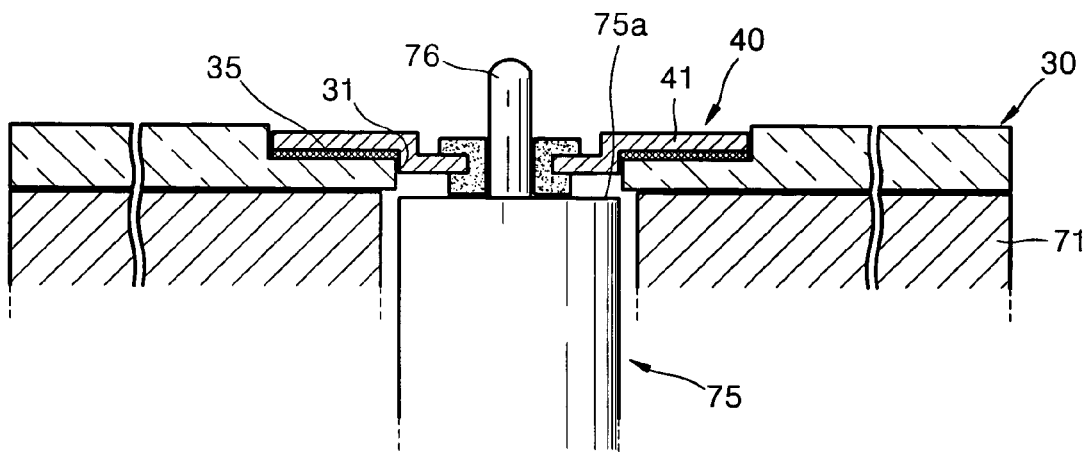
Figure 5C:
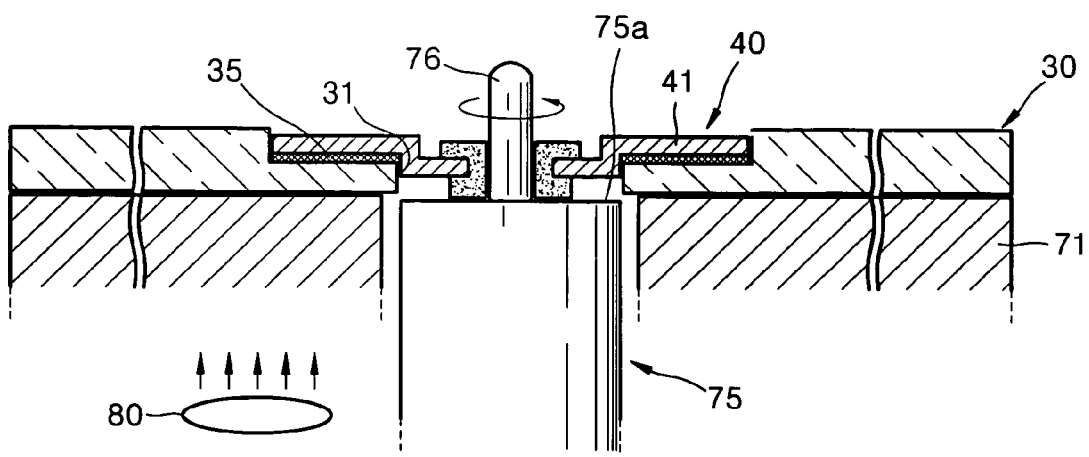

FIGS. 5A-5C illustrate a process of manufacturing a hub-mounted optical disk according to an embodiment of the present invention. Referring to FIG. 5A, to manufacture a hub-mounted optical disk, a stage 71 and a magnetic chuck 75 having a central pole 76 projecting out from the center are installed. Here, the magnetic chuck 75 may be moved up and down with an upper end 75a thereof projecting upward on the stage 71.

After the substrate 30, having the hollow 31 and the indented portion 33, is mounted on the stage 71, the hub 40 is combined with the upper end 75a of the magnetic chuck 75. The viscous UV hardening resin 35 is then applied on the indented portion 33. Next, when the magnetic chuck 75 is operated such that the plate 41 becomes in contact with the indented portion 33 as shown in FIG. 5B, the UV hardening resin 35 is dispersed over the entire contact surface due to a contact pressure applied by the plate 41.

As illustrated in FIG. 5C, the UV hardening resin 35 is then exposed to UV light and cured so that the hub 40 is affixed to the substrate 30. Here, a UV lamp 80 is positioned at one location in such a way as to cure the entire UV hardening resin 35. In an embodiment of the invention, a curing process, including rotating the substrate 30 and the hub 40 to create a centrifugal force, helps to evenly spread the resin.

Here, although one UV lamp 80 has been shown in FIG. 5C, the UV lamp 80 may be disposed at a plurality of positions including the upper surface of the magnetic chuck 75. Furthermore, while FIGS. 5A-5C show that the UV hardening resin 35 is applied over the indented portion 33 of the substrate 30 only, the UV hardening resin 35 may also be applied along an inner sidewall of the indented portion 33 or hollow 31 If the UV hardening resin is applied along the inner sidewall of the indented portion 33 or hollow 31, a relatively more robust bonding effect between the substrate 30 and the hub 40 occurs.

Figure 6:
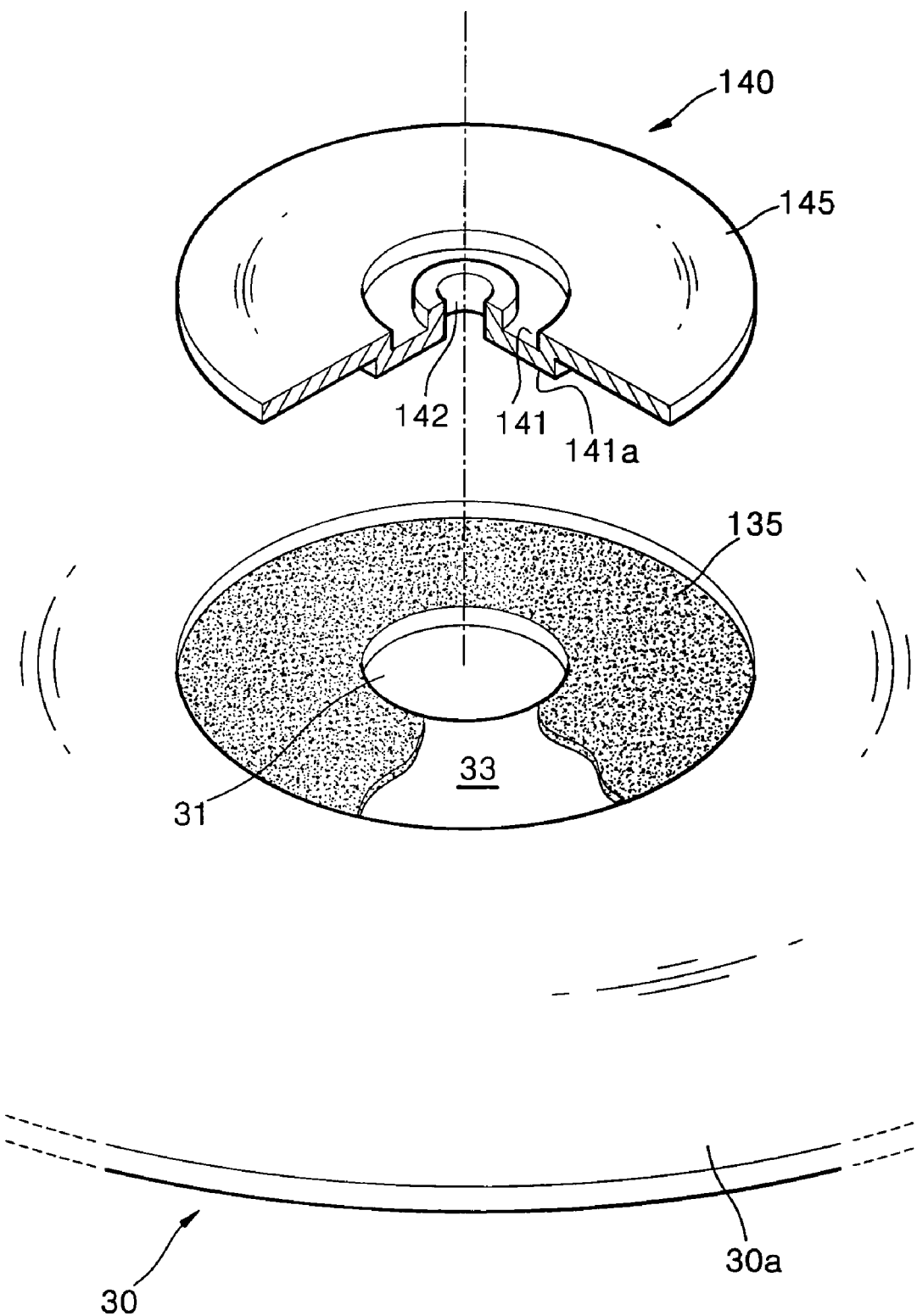
FIG. 6 is a cross-sectional view of a hub-mounted optical disk according to another embodiment of the present invention.

Referring to FIG. 6, a hub-mounted optical disk according to another embodiment of the present invention includes a substrate 30, having a hollow 31 and a hub 140, that is mounted on the substrate 30.

The substrate 30 has an indented portion 33 that is engraved to a predetermined depth on the inside of a non-recording surface 30a where no information is recorded. Since the substrate 30 has substantially the same structure as that described with reference to FIG. 2, a detailed explanation thereof will not be given.

The hub 140 is constructed of a single element and is divided into a seating portion 141 and a flange portion 145. The seating portion 141, sitting on the turntable (51 of FIG. 2), is located within the hollow 31. A fitting hole 142, fitted with the rotating axis (55 of FIG. 2), is formed within the seating portion 141 such that the optical disk is centered on the rotating axis 55. The flange portion 145 is attached to the indented portion 33 and is disposed along the outer perimeter of the seating portion 141 at a greater height than the seating portion 141.

The hub 140 is made from magnetic material and clamped to the optical disk by magnetic attraction of a magnet (53 of FIG. 2) that is mounted on the turntable (51 of FIG. 2). The magnetic material may be stainless metal such as SUS 430.

A UV hardening resin 135 is used to affix the hub 140 to the substrate 30. To this end, the UV hardening resin 135 is applied between the indented portion 33 and the hub 140 and irradiated by UV light so as to cure the UV hardening resin 135. Since the process of bonding of the hub 140 to the substrate 30 is substantially similar as that described with references to FIGS. 5A-5C, a detailed explanation thereof will not be given.

Meanwhile, the seating portion 141 has a lower end 141a that projects downward one side of the substrate 30 and acts as a stack ring. To this end, in an embodiment of the invention, the seating portion 141 projects at a height of about 0.1 to 0.15 mm from one side of the substrate 30. Since this construction is substantially the same as that shown as in the previously described embodiment, a detailed explanation thereof will not be given. By designing the seating portion in this way, reducing the overall height of the optical disk as well as protecting an information recording surface from damage and contamination is possible.

Since the optical disk of the present invention includes the indented portion formed on the non-recording surface of the substrate and the hub mounted through the indented portion and the hollow, reducing the overall thickness to a level that corresponds to the thickness of the optical disk substrate and thus realize a compact optical disk drive is possible. Furthermore, a portion of the hub projecting to a very small height may prevent contamination of the information recording surface without a separate stack ring during storage and transportation of a stack of optical disks.

Furthermore, use of a magnetic chuck makes precisely affixing the hub to a location of the optical disk substrate possible. In addition, by forming a projecting portion in a moving plate of an injection molding die, manufacturing an optical disk substrate in a single process is possible.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A hub-mounted optical disk comprising:
   a substrate having a hollow and an indented portion, indented from an upper surface of the substrate, on an inside of a non-recording surface thereof; and
   a hub including:
      a plate having a fitting hole defined therein by an inner edge of the plate, engaged in the hollow and supported by the indented portion of the substrate, and
      a central ring including a groove into which a portion of the plate is inserted to guide a location where the optical disk is mounted with respect to a center of a turntable.

2. The hub-mounted optical disk of claim 1, wherein the plate comprises:
   a seating portion that is located within the hollow and which is seated on the turntable; and
   a flange portion that is attached to the indented portion and which is disposed along an outer perimeter of the seating portion at a different height from the seating portion, wherein the central ring is combined with the seating portion.

3. The hub-mounted optical disk of claim 1, wherein a depth of the indented portion is d, and $0.1 \leq d \leq 0.6$ mm.

4. The hub-mounted optical disk of claim 1, wherein the central ring is fitted into the fitting hole by insertion-injection molding.

5. The hub-mounted optical disk of claim 1, further comprising an ultra-violet (UV) hardening resin that is applied between the indented portion and the plate and which is cured by UV radiation to bond the plate to the substrate.

6. The hub-mounted optical disk of claim 1, wherein an end of the central ring projects outward along one side of the substrate.

7. The hub-mounted optical disk of claim 6, wherein an end of the central ring projects outward along the one side of the substrate at a height of 0.1 to 0.15 mm.

8. The hub-mounted optical disk of claim 1, wherein the plate comprises a magnetic material, and the central ring comprises a plastic material.

9. The hub-mounted optical disk of claim 1, wherein the central ring is inserted into the fitting hole to surround the inner edge of the plate at upper, inner and lower surfaces thereof.

10. A hub-mounted optical disk comprising:
   a substrate having a hollow and an indented portion, indented from an upper surface of the substrate, on an inside of a non-recording surface thereof; and
   a hub including:
      a seating portion engaged in the hollow and having a fitting hole defined therein by an inner edge of the seating portion and a lower surface, the seating portion being indented from a portion of a lower surface of the substrate which is not dedicated to centering the hub, and
      a flange portion attached to the indented portion and disposed along the outer perimeter of the seating portion at a different height than the seating portion as measured from an upper surface of the indented portion toward the upper surface of the substrate.

11. The hub-mounted optical disk of claim 10, wherein a depth of the indented portion of the substrate is d, and $0.1 \leq d \leq 0.6$ mm.

12. The hub-mounted optical disk of claim 10, further comprising an ultra-violet (UV) hardening resin that is applied between the indented portion and the hub and which is cured by UV radiation to bond the hub to the substrate.

13. The hub-mounted optical disk of claim 10, wherein an end of the seating portion projects outward along one side of the substrate.

14. The hub-mounted optical disk of claim 13, wherein an end of the seating portion projects outward along one side of the substrate at a height of 0.1 to 0.15 mm.

* * * * *